(12) United States Patent
Fayyad et al.

(10) Patent No.: US 7,822,745 B2
(45) Date of Patent: Oct. 26, 2010

(54) KEYWORD SET AND TARGET AUDIENCE PROFILE GENERALIZATION TECHNIQUES

(75) Inventors: Usama M. Fayyad, Sunnyvale, CA (US); Pavel Berkhin, Sunnyvale, CA (US); Andrew Tomkins, San Jose, CA (US); Rajesh Girish Parekh, Mountain View, CA (US); Jignashu Parikh, Gujarat (IN); David Wellspring Sculley, II, Somerville, MA (US)

(73) Assignee: Yahoo! Inc., Sunnyvale, CA (US)

( * ) Notice: Subject to any disclaimer, the term of this patent is extended or adjusted under 35 U.S.C. 154(b) by 246 days.

(21) Appl. No.: 11/444,996

(22) Filed: May 31, 2006

(65) Prior Publication Data

US 2007/0282785 A1     Dec. 6, 2007

(51) Int. Cl.
| G06F 7/00 | (2006.01) |
| G06F 17/30 | (2006.01) |
| G06Q 30/00 | (2006.01) |
| G07G 1/14 | (2006.01) |

(52) U.S. Cl. ..................................... 707/732; 705/14.1
(58) Field of Classification Search .................... 705/14
See application file for complete search history.

(56) References Cited

U.S. PATENT DOCUMENTS

| 6,651,058 | B1 * | 11/2003 | Sundaresan et al. ................. 1/1 |
| 6,654,749 | B1 * | 11/2003 | Nashed .......................... 707/10 |
| 6,785,822 | B1 | 8/2004 | Sadhwani-Tully |
| 2002/0029267 | A1 * | 3/2002 | Sankuratripati et al. ...... 709/224 |
| 2003/0208474 | A1 * | 11/2003 | Soulanille et al. ............... 707/3 |
| 2004/0059708 | A1 * | 3/2004 | Dean et al. ..................... 707/1 |
| 2004/0181525 | A1 * | 9/2004 | Itzhak et al. .................... 707/5 |
| 2005/0222989 | A1 * | 10/2005 | Haveliwala et al. ............. 707/3 |
| 2006/0041477 | A1 * | 2/2006 | Zheng .......................... 705/14 |
| 2006/0074853 | A1 * | 4/2006 | Liu et al. ....................... 707/1 |
| 2006/0074906 | A1 * | 4/2006 | Steels et al. .................... 707/5 |
| 2006/0106793 | A1 * | 5/2006 | Liang ............................. 707/5 |

FOREIGN PATENT DOCUMENTS

| WO | WO 03/056825 | 7/2003 |
| WO | WO 2005/013072 | 2/2005 |
| WO | WO 2007/142771 | 12/2007 |

OTHER PUBLICATIONS

Bin Yu, Munidar P. Singh; Searching Social Networks; Jul. 14-18, 2003; p. 67-68;.*
David W. Cheung, Ben Kao, Joseph Lee; "Discovering user access patterns on the World Wide Web" 1998;.*
Kumar et al., Trawling the Web for Emerging Cyber-Communities, Computer Networks, 31(1-16), pp. 1481-1493, 1999.

(Continued)

*Primary Examiner*—Neveen Abel Jalil
*Assistant Examiner*—Jermaine Mincey
(74) *Attorney, Agent, or Firm*—Weaver Austin Villeneuve and Sampson LLP

(57) ABSTRACT

A variety of techniques are described by which keyword sets and target audience profiles may be generalized in a systematic and effective way with reference to relationships between keywords, profiles, and the data of an underlying user population.

56 Claims, 5 Drawing Sheets

OTHER PUBLICATIONS

Flake et al., Efficient Identification of Web Communities, In Proceedings of the Sixth ACM SIGKDD International Conference on Knowledge Discovery and Data Mining, pp. 150-160, Aug. 20- 23, 2000.

R. Andersen and K. Lang. Communities from Seed Sets, In Proceedings of the Fifteenth International World Wide Web Conference (WWW-06), May 23-26, 2006.

T. Hastie et al., Elements of Statistical Learning Theory: Data Mining, Inference, and Prediction, Springer Series in Statistics, 2001.

T. Hofmann, Probabilistic Latent Semantic Indexing, In Proceedings of the Twenty-Second International ACM-SIGIR Conference on Information Retrieval, 1999.

R. Agrawal and R. Srikant, Fast Algorithms for Mining Association Rules, In Proceedings of the 20th International Conference on Very Large Databases, Santiago, Chile, pp. 487-499, 1994.

Berkhin, Survey of Clustering Data Mining Techniques, Technical Report, Accrue Software, 2002.

Good, The Population Frequencies of Species and the Estimation of Population Parameters, Biometrika, vol. 40, parts 3 and 4, 237-264, Dec. 1953.

I. Dhillon et al., Information-theoretic co-clustering, In Proceedings of the Ninth ACM SIGKDD International Conference on Knowledge Discovery and Data Mining, pp. 89-98, Aug. 24-27, 2003.

A. Banerjee et al., Clustering with Bregman Divergences, In Proceedings of the SIAM International Conference on Data Mining, pp. 234-245, 2004.

Singhal, Modern Information Retrieval: A Brief Overview, IEEE Data Eng. Bull. 24(4): 35-43 (2001).

Bartal, Probabilistic Approximations of metric Spaces and Its Algorithmic Applications, FOCS 1996: 184-193.

Kleinberg, J., Authoritative Sources in a Hyperlinked Environment., Journal of the ACM, 46(5), pp. 604-632, Sep. 1999.

International Search Report dated Nov. 13, 2007 issued in PCT/US2007/010926.

Kumar et al., Trawling the Web for Emerging Cyber Communities, Computer Networks, 31(1-16), pp. 1481-1493, 1999.

T. Hastie, et al., Elements of Statistical Learning Theory: Data Mining, Inference, and Prediction, Springer Series in Statistics, 2001.

T. Hoffman, Probabilistic Latent Semantic Indexing, In Proceedings of the Twenty-Second International ACM-SIGIR Conference on Information Retrieval, 1999.

R. Agrawal, et al., Fast Algorithms for Mining Association Rules, In Proceedings of the $20^{th}$ International Conference on Very Large Databases, Santiago, Chile, pp. 487-499, 1994.

Berkhin, P. Survey of Clustering Data Mining Techniques, Technial Report, Accrue Software, 2002.

Banerjee, A., et al., Clustering with Bregman Divergences, In Proceedings of the SIAM International Conference on Data Mining, pp. 234-245, 2004.

Singhal, A., Modern Information Retrieval: A Brief Overview, IEEE Data Eng. Bull, 24(4):35-43, 2001.

Bartal, Y., Probabilistic Approximations of Metric Spaces and Its Algorithimic Applications, FOCS, 184-193, 1996.

* cited by examiner

KEYWORD SET AND TARGET AUDIENCE PROFILE GENERALIZATION TECHNIQUES

BACKGROUND OF THE INVENTION

The present invention relates to techniques for generalizing keyword sets and target audience profiles and, more specifically, using such generalized keyword sets and profiles to enhance online advertising campaigns.

A key success metric for an online advertisement campaign is the number of conversion events (e.g., sale of goods or services, registration, or lead generation) that are attributed to the campaign. Online advertisers are therefore interested in maximizing conversion events given a specific budget. Branded ads and sponsored search ads are considered the two main forms of online advertising. Both forms of online advertising strive to show the most relevant ads to users in order to maximize the ad effectiveness. In branded advertising, advertisers typically specify a profile of the user segment they wish to target, i.e., the target audience. Ads are then shown to users who correspond to the target audience. In sponsored search, advertisers typically bid on a set of keywords for which their ads would be displayed. Ads are displayed when any of the advertiser's bidded keywords are matched based on the underlying context of the users' online actions. For example, in sponsored search advertising associated with search engines, ads are matched when a search query specified by the user matches one of the keywords on which an advertiser has bid.

Large advertisers either have in-house marketing divisions or use professional ad agencies to identify the target audience profiles they should target in their branded ads, as well as to compile lists of keywords and phrases for their sponsored search ads. As stated above, their main objective is to structure the ad campaign so as to maximize the number of conversion events achieved for a given budget. Unfortunately, such conventionally derived profiles and keyword sets have shortcomings which are becoming more problematic as the online advertising market matures.

For example, given that there are relatively few "obvious" keywords relating to a given product or service as compared with the number of potential advertisers, the cost of bidding on the common keywords is becoming prohibitive for even the larger advertisers. This forces advertisers to use undesirably small sets of keywords, and/or to attempt to identify related but less desirable keywords to include in their keyword set, thus potentially reducing the efficacy of their campaigns. Even when costs are not a consideration, finding appropriate keywords is a non-trivial undertaking given that a significant part of queries (e.g., query tail) is not monetized at all.

Crude techniques exist for identifying additional keywords which are related to a particular keyword. For example, in conjunction with returning a set of search results, a search engine might also suggest other related keywords to the user for refining the search. However, because such techniques are typically based on lexical or content analysis, they are not particularly instructive to an advertiser in terms of how effective the additional keywords might be with regard to the intended target audience. In addition, such techniques are not useful in identifying additional keywords having an unexpected or unobvious relationship with the original keyword(s). Similarly, the target audience profiles typically used by advertisers in branded advertising campaigns may be too narrowly or inappropriately focused due to the fact that there are unappreciated correlations in the underlying user population.

In view of the foregoing, there is a need for improved techniques by which advertisers can more effectively target their advertising campaigns.

SUMMARY OF THE INVENTION

According to the present invention, a variety of techniques are provided by which keyword sets and target audience profiles may be generalized in a systematic and effective way with reference to relationships between keywords, profiles, and the data of an underlying user population. According to a specific embodiment, techniques are provided for generalizing at least one of an initial keyword set and an initial target audience profile. The initial keyword set and the initial target audience profile are received as inputs. The initial keyword set includes a plurality of initial keywords. The initial target audience profile includes an initial profile parameter value for each of a plurality of profile parameters. The initial keyword set and the initial target audience profile are processed with reference to user data representing a population of users to determine relationships among the initial keyword set, the initial target audience profile, and the user data. At least one of a generalized keyword set and a generalized target audience profile is generated with reference to selected ones of the relationships among the initial keyword set, the initial target audience profile, and the user data.

According to another specific embodiment, methods and apparatus are provided for generalizing an initial keyword set which includes a plurality of initial keywords. The initial keyword set is received as input. The initial keyword set is processed with reference to user data representing a population of users to determine relationships among the initial keyword set and the user data. A generalized keyword set is generated with reference to selected ones of the relationships among the initial keyword set and the user data.

According to yet another specific embodiment, methods and apparatus are provided for generalizing an initial target audience profile which includes an initial profile parameter value for each of a plurality of profile parameters. The initial target audience profile is received as input. The initial target audience profile is processed with reference to user data representing a population of users to determine relationships among the initial target audience profile and the user data. A generalized target audience profile is generated with reference to selected ones of the relationships among the initial target audience profile and the user data.

According to various embodiments of the invention, a variety of generalization and expansion techniques may be used on these data to derive one or both of these generalized sets. Examples of such techniques include, but are not limited to (1) constructing a bipartite graph representing at least some of the relationships and performing propagations within the bipartite graph, (2) constructing a directed graph representing at least some of the relationships and employing a graph subset expansion technique, (3) constructing and using a probabilistic model representing at least some of the relationships, (4) generating a plurality of itemsets grouping keywords and/or users and using a data mining co-occurrence technique on the itemsets, (5) constructing a matrix relating users and/or keywords and applying at least one similarity measure to the matrix, (6) forming keyword clusters and/or user clusters, and evaluating the keyword and/or user clusters, (7) identifying selected ones of additional keywords and/or additional users derived from the user data using similarity measures, and (8) constructing a keyword space with reference to search results corresponding to at least some of the initial keywords, mapping additional keywords derived from the user data to the keyword space, and identifying selected ones of the additional keywords for inclusion in the generalized keyword set with reference to the mapping and a similarity measure.

A further understanding of the nature and advantages of the present invention may be realized by reference to the remaining portions of the specification and the drawings.

DETAILED DESCRIPTION OF SPECIFIC EMBODIMENTS

Figure 1:
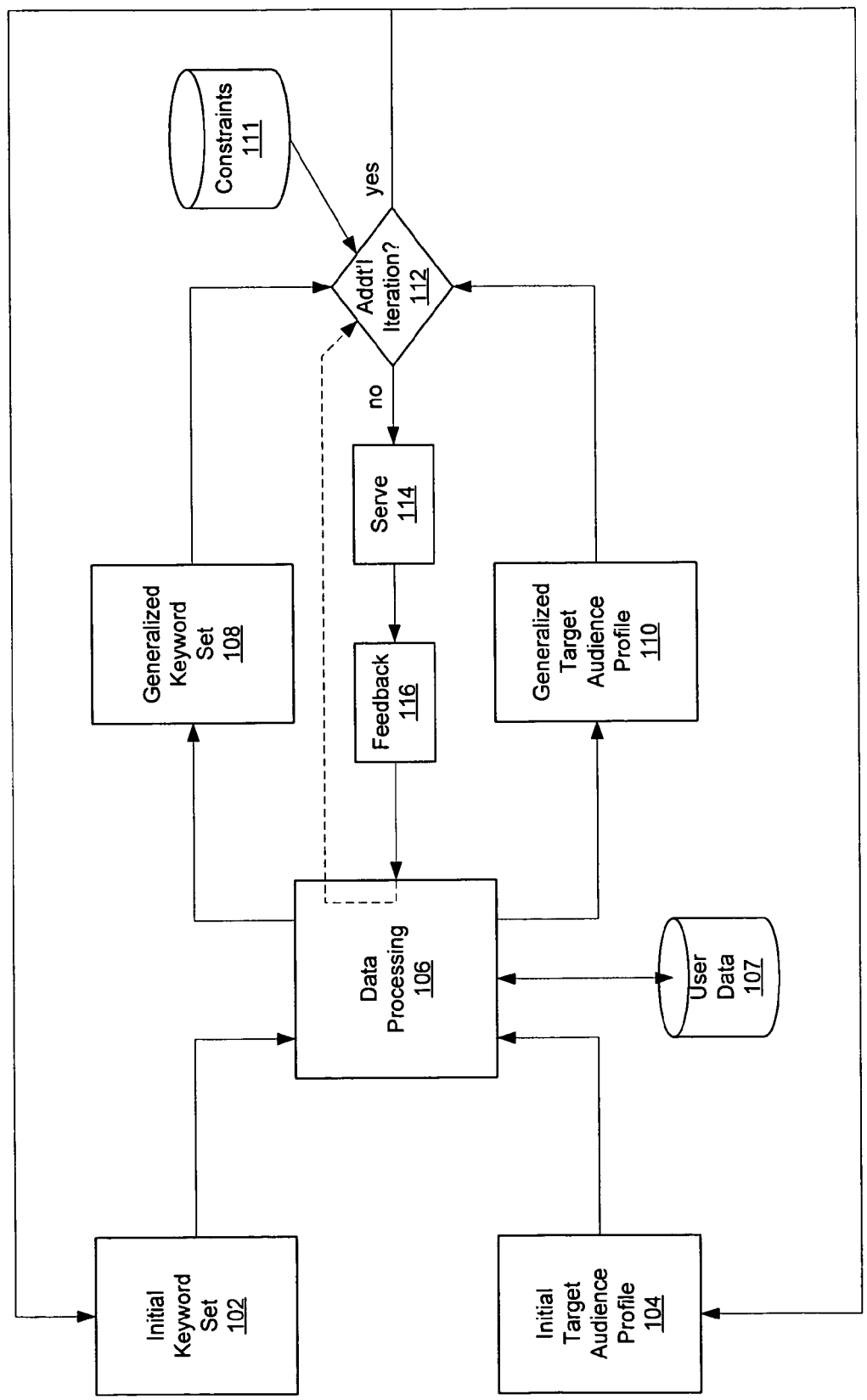
FIG. 1 is a simplified flow diagram illustrating aspects of a specific embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to the present invention, keyword sets and/or target audience profiles may be generalized with reference to data drawn from an underlying user population. According to various embodiments, processes designed in accordance with the invention may employ as input either or both of a keyword set and a target audience profile. According to some embodiments, the present invention combines analysis of keywords with analysis of users represented by a target audience profile, and using relationships among these data, facilitates generalization of either or both of the keyword set and the target audience profile. As will become clear, generalization of keyword sets and user profiles may result in larger, expanded keyword sets and profiles, but may also result in modified keyword sets and profiles which may be smaller than the original sets and profiles.

According to various specific embodiments, an initial target audience profile identified, for example, by an advertiser can be usefully generalized to target a generalized (and potentially wider) set of users who would respond as well as or even better than the users identified by the original profile. Similarly, a seed set of keywords may only intersect with or be a subset of a generalized (and potentially larger) set of keywords which is more effective than the original seed set. For example, such a generalized set of keywords might include less frequently searched but highly relevant keywords that are cheaper for advertisers to bid on. Further, a generalized keyword set might include keywords that are highly relevant but whose relationship with the initial set of keywords is not obvious. As will be appreciated, generalization of both target audience profiles and keyword sets according to the present invention potentially enables, among other things, more precise and effective advertising campaigns.

According to the invention, keyword set and user profile generalization is based on the interplay of several kinds of related data. Conceptually, the following fundamental data are involved: $U=\{u\}$ is a set of users characterized in terms of demographics and behavioral information. A user profile $U_0$ is a subset of the set of users that is described in terms of the values taken on by these attributes expressed according to some language. It should be noted that in the following description a user profile U is identified with the set of users that match that profile. $W=\{W\}$ is a set of keywords. Each keyword could actually be a phrase.

A fundamental problem addressed by the present invention may be stated as follows: given a user (e.g., a target audience) profile $U_0 \subset U$ and/or a "seed" set of keywords $W_0 \subset W$, find a larger set $W_1$ of keywords (each having an associated relevance measure), and/or a broader user profile $U_1$ with an associated relevance measure.

According to various embodiments of the invention, a variety of methodologies for seed keyword set and target audience profile generalization may be used either independently or in combination. Several such methodologies are described below for exemplary purposes. In addition, use of some of these methodologies in combination with each other is described. However, it should be understood that other suitable techniques and combinations may be employed and that the invention should not be limited by reference to such methodologies or combination thereof.

FIG. 1 is a flow diagram illustrating an embodiment of the present invention in which both a seed keyword set 102 and an initial target audience description or profile 104 are provided as input. As will become clear, embodiments are contemplated in which only one of these is provided as input. And according to various specific embodiments, either or both of these inputs may be modified or generalized with reference to how these keywords and users corresponding to the profile relate to other keywords and other users associated with an underlying user population. Specific embodiments of the invention make use of data mining and data propagation algorithms 106 to access relevant data from a rich data set 107 representing a user population (e.g., Yahoo! users), and to generate a generalized set of keywords 108, a generalized target audience profile 110, or both.

According to some implementations, a generalized set of keywords generated according to the invention may be an expanded set which includes many more keywords than the original seed keyword set. However, it may also be equal to or smaller in size than the original set. That is, a smaller set of keywords might be identified which are more relevant to the specified target audience. In general, the generalized keyword set is intended to be more effective than the original seed set with respect to the goals of the advertiser and/or the advertising services provider. A wide variety of measures of effectiveness are contemplated. According to one approach in which effectiveness is understood as higher revenue per search, a larger keyword set would be more effective.

Similarly, a generalized target audience profile generated according to the invention may correspond to either a larger or smaller subset of the user population than the initial profile. The new subset may be entirely encompassed within the original subset or vice versa. Alternatively, the new subset may only intersect with the original subset or, in some cases, it is possible that the new subset not overlap with the original subset at all. Again and in general, the generalized target audience profile is intended to be more effective at achieving the advertiser's goals.

The user data representing the underlying user population may include any of a wide variety of demographic and behavioral data. Suitable demographic data may represent virtually any characteristic by which a user may be identified including, for example, age, gender, geographic location, marital status, household size, occupation, income level, hobbies, interests, likes, dislikes, favorite sites, user level for specific sites or services (e.g., premium vs. free; frequent vs. infrequent), etc. User data may also include any data which are representative of a user's online actions and preferences. For example, search terms and refinements, search results, responses to search results (e.g., what did the user "click" on), responses to advertisements, frequently visited sites, sites or services for which the user is registered, categories of content browsed, frequency of site visits, duration spent on the site, etc. In addition, user data may be organized or interrelated in a variety of ways such as, for example, a user session might relate a specific user with a set of search terms, search results, or advertisements. Similarly, a user session might relate the specific content that user consumed and provide valuable clues about the user's preferences.

According to some embodiments, generalization of the keyword set and/or the target audience profile can continue iteratively for further generalization or focus. In addition, subsequent iterations do not necessarily need to use both a generalized profile and a generalized keyword set, e.g., a subsequent run could use only one of the generalized sets.

A wide variety of termination conditions or constraints 111 may be employed to determine whether and when to continue iterating (112). For example, successive iterations could be separated by intervening advertising campaigns, the results of which may be used to decide when to stop refining the keyword set and/or the target audience profile, e.g., if a certain number of conversion events are achieved. Alternatively, advertiser budget constraints may be used to determine when to stop iterating, e.g., the cost of using the generalized keyword set in an advertising campaign can be quantified. In a further example, if the delta between the keyword sets or target audience profiles of successive iterations is below a certain threshold, the process may terminate. In yet another example, the relevance of the current keyword set and/or target audience profile to the advertiser's market may be determined (either computationally or by human review) and, if sufficiently relevant, the process may be (automatically or manually) terminated. The termination condition might even be as simple as terminating upon completion of some predetermined number of iterations.

When a decision to stop iterating is made (112), the keyword set and/or the target audience profile are served (114), e.g., deployed as the basis for an online advertising campaign. According to various embodiments, the deployment is monitored to provide feedback (116) for the purpose of evaluating the effectiveness of the keyword set and/or the target audience profile in achieving the goal(s) of the deployment. Such feedback may be employed for reporting purposes as well as input for subsequent iterations (as represented by the dashed arrow) of the techniques of the present invention.

Specific Generalization Methods

Specific methodologies for generalizing keyword sets and target audience profiles will now be described. As mentioned above, some of these techniques may employ as input one or both of a keyword set and a target audience profile. It should also be noted that in some of the examples below, a particular one of these two types of inputs may be referred to for exemplary purposes. However, those of skill in the art will understand that some of these embodiments are equally applicable to generalize the other type of input.

Propagation Between Keywords, Sessions, and Users

One such approach involves propagation between keywords, sessions, and users and is based on the following ideas: every user has sessions; every session contains keywords; there is a relationship between users and keywords through their sessions. It should be noted that keywords may be words that are entered by users during their sessions (e.g., search terms), or words that are responsive to the users' entered words (e.g., search results).

Figure 2:
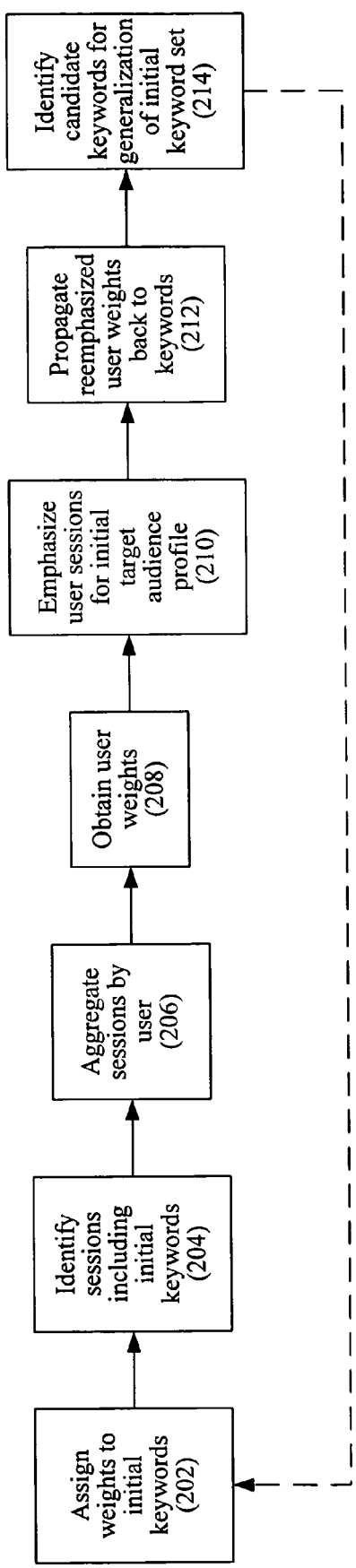
FIGS. 2-4 are simplified flow diagram illustrating exemplary generalization techniques employed suitable for use with specific embodiments of the present invention.

According to a specific embodiment of the invention illustrated in FIG. 2, a bipartite propagation technique is used to generalize a seed keyword set. Initial weights are assigned to each of the keywords in the seed keyword set (202). These initial weights may start out equal, or may vary depending on, for example, criteria provided by the advertiser which initially emphasize certain favored keywords. Using previously gathered user data describing the online sessions of a population of users (e.g., Yahoo! users), the sessions which include one or more of the keywords in the seed keyword set are identified (204). These sessions are then aggregated by user (206), and a user weight is obtained for each user based on the keywords in that user's sessions and the corresponding keyword weights (208). Thus, users who generated more of the seed keywords in their sessions would be considered more important, i.e., be assigned a greater weight, than users generating relatively fewer of the keywords in their sessions.

The sessions of the users corresponding to the initial target audience profile are then emphasized (210) relative to other users. This means that the users with higher weights can be somehow mixed with original user profile to avoid a phenomenon referred to in Web research as "concept drift." The reemphasized user weights are then propagated back to the keywords in the sessions corresponding to each user (212). Keywords having weights which exceed respective thresholds are identified as candidates for generalization of the seed keyword set (214). The generalized keyword set may then be used as input for subsequent iterations.

It should be noted that there are many models of propagation on a bipartite graph which may be employed in such an embodiment. According to a specific embodiment, bipartite propagation is employed as follows. A user session is defined as a sequence of keywords $w_0, w_1, w_2, \ldots, w_N$ associated with a given user during a particular session. Let S be the set of all user sessions. An importance weight $p^{w,0}$ is associated with each keyword w. $p^{w,0}$ is initially set to $1/|n|$ for words $w \in W_0$, $n=|W_0|$, and to zero otherwise. These weights are then propagated to a set of sessions:

$$p^{s_u,0} = \Sigma_{w \in S^u} p^{w,0}$$

The summation goes over keywords w belonging to a user session $s_u$. The resulting user session weights can be normalized to sum to one. According to a specific embodiment, an importance weight is assigned to sessions which is equal to the sum of the importance weights of the keywords they contain. These importance weights may be further propagated to the user level:

$$p^{u,1} = \Sigma_u p^{s_u,0}$$

The summation goes over the sessions $s_u$ belonging to a user u. This formula assigns users an importance weight equal to the sum of the importance weights of their sessions. This formula favors users that have very many sessions as opposed to users with specific interests that resulted in a few sessions. Further, information about target audience profile has not yet been introduced. The previous formula can be modified as follows to account for both of these issues:

$$p^{u,1} = \alpha F_u(\Sigma_u p^{s_u,0}) + (1-\alpha)p^{u,0}$$

In this case, the function $F(\cdot)$ takes care of the user u's activity level, $0<\alpha<1$ and importance weight $p^{u,0}$ initially equals to $1/|m|$ for $u \in U_0$, $n=|U_0|$. The importance weights can now be propagated back to the keywords as follows. Given, $00<\beta, \gamma<1$, $$p^{s_u,1} = \beta p^{u,1} + (1-\beta)p^{s,0}$$

This describes the processing for a single iteration. As discussed above, multiple iterations can be performed along with renormalization of weights that result in a new weight $p^{w,k}$, $k>0$. The keywords having importance weight above a certain threshold can qualify for extension.

Directed Graph Random Walk

Figure 3:
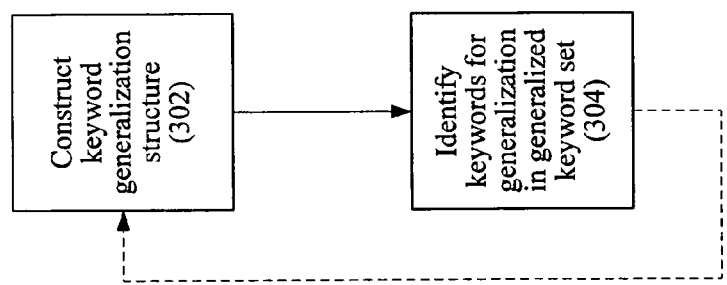

Referring now to FIG. 3, instead of or even after completing one or more iterations of the process illustrated in FIG. 2, a generalization structure, e.g., a directed graph, may be constructed in which each of the keywords in the seed keyword set (or a preliminarily generalized keyword set) is a node and in which keywords occurring in the same session are connected by an edge (302). The direction of an edge represents some relationship between the connected keywords such as, for example, which occurred first in the session in which both appeared. The assumption in such a case is that when one keyword appears later in a session than another keyword, the second keyword may be a refinement of the first. In addition, the edges connecting keywords may be weighted in accordance with, for example, the respective weights associated with each of the connected keywords. As will be described in greater detail below, any of a variety of propagation techniques may then be applied to the generalization structure to identify the subset keywords in the generalization structure which should be included in a generalized or modified keyword set (304).

Figure 4:
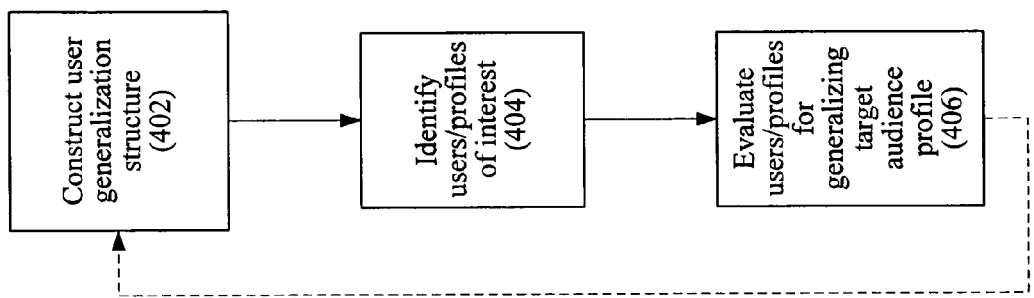

Similarly, as shown in FIG. 4, a generalization structure may be constructed in which each node represents at least one of the users represented in the initial or already generalized target audience set (402). The phrase "at least one" indicates that the nodes of the graph could also represent user profiles corresponding to more than one user, i.e., a graph of user profiles may be converted to a graph of users by collapsing all profiles that belong to the same user. Connections between the nodes in the graph may represent, for example, the degree of similarity between connected users or user profiles (e.g., similar demographics or online behaviors), or the extent to which there is overlap among keywords of interest generated in the sessions of the corresponding users. The number of profile parameters represented by the information in the generalization structure may vary considerably without departing from the scope of the invention. They may number from only a few, up to tens, hundreds, thousands, or even more parameters.

Any of a variety of propagation techniques may then be used to propagate between the nodes of the generalization structure to identify users or user profiles of interest (404). The manner in which the generalization structure is constructed, the nature of the relationships between connected nodes, and the cost of propagating from one node to another can be manipulated to control the set of propagations which are allowable and to control the extent to which certain propagations apply. The users and/or profiles identified are then evaluated to determine how to generalize the target audience profile (406).

As referred to herein, a generalization structure is any kind of organized representation of data which is operable to receive as input one or more profiles or keyword sets and return a generalized set of profiles and/or keywords which are related in some way. At least some of the information represented some of the generalization structures employed by embodiments of the invention may be hierarchically organized. For example, a user may be represented by a user profile which includes a geographic parameter within which the relevant information may be expressed hierarchically, e.g., address, street, city, county, state, country. By generalizing a profile along such an axis, e.g., from city to county, potentially more users might be captured. Another example of hierarchically organized information which may be part of a user profile is consumer products. For example, the product category "digital cameras" includes more specific categories such as "point-and-shoot," and "digital SLR." Notwithstanding the foregoing, it should also be understood that the generalization structures of the present invention may employ parameters and information which are not organized hierarchically. For example, gender is a highly useful demographic parameter which is not hierarchically organized. Specific keyword may be part of a target audience or user profile and yet have no discernible hierarchical interrelationships.

In some generalization structures constructed according to the invention, there may be a "generalization cost" associated with propagating from one node (e.g., one user or user profile) to another. As an illustration of this concept in the context of the digital camera example mentioned above, the cost of propagating between two users who are both interested in digital point-and-shoot cameras would be much less than the cost associated with propagating within the generalization structure from one of those users to a user interested in analog SLR cameras.

According to some implementations, there may be a generalization cost for propagating between any pair of users or user profiles in the generalization structure which is employed as a constraint in the generalization or modification of the initial target audience profile. In addition, keywords (even non-overlapping or unrelated keywords) may be grouped together according to the invention because of the proximity within the generalization structure of users who have employed those keywords. Still further, keyword overlap information relating seemingly unrelated user profiles can be used to further inform the propagation among nodes in the generalization structure (and therefore generalization of the target audience profile). Further details regarding specific techniques by which such propagations may be accomplished are discussed below.

According to a specific embodiment, a directed graph (i.e., specific kind of generalization structure) is generated on the set of all keywords where weighted edge w→v exists if there is a user session in which keyword v follows keyword w indicating that v is (possibly) a refinement of w. An edge weight can be set to reflect the nature of the session, the number of such sessions, and/or different factors pre-assigned to users that satisfy the target audience profile and users that do not. Different weight propagation schemes exist for propagating the initial seed set of keywords to a broader set. In a simple implementation a unit weight is assigned to each node in the seed set. Then a fixed fraction of weight is distributed from each node along all its edges proportionally to the edge weight and the remaining fraction of weight is kept on a source node. This process can be repeated a finite number of times.

Similarly, a graph may be created on user profiles in which one user profile connects to another if they share a sufficient weight of keywords of interest. As mentioned above, such a graph may be converted to a graph on users by collapsing all profiles that belong to the same user. At this point, a seed set may be defined on the users based, for example, on a target audience profile, and information may be propagated from this seed set to other users based on the techniques described above. At the completion of such propagation, the characteristics of the heavily-weighted users may be analyzed to determine possible generalizations of the targeted user profile.

Graph Subset Expansion

According to another set of embodiments, a similar generalization structure (i.e., a directed graph representation) can be used but in other than a random walk setting. Given a relevant seed set, a variety of methodologies may be applied to generalize the seed set into a larger set according to some measure of the quality of a generalization. Examples of such methodologies are described in *Trawling the Web for Emerging Cyber-Communities*, R. Kumar, P. Raghavan, S. Rajagopalan, and A. Tomkins, Computer Networks, 31(1-16), pp. 1481-1493, 1999, and in *Efficient Identification of Web Communities*, G. Flake, S. Lawrence, and C. Lee Giles, In Proceedings of the Sixth ACM SIGKDD International Conference on Knowledge Discovery and Data Mining, pp. 150-160, 2000 (the entire disclosures of both of which are incorporated herein by reference for all purposes), and in Communities from Seed Sets, K. Lang and R. Anderson, In Proceedings of the Fifteenth International World Wide Web Conference (WWW-06). The resulting set(s) may then be employed as a generalization of keywords, user profiles, or both.

Probabilistic Models

According to still further embodiments, probabilistic modeling techniques offer a powerful framework for generalizing keyword sets and target audience profiles. According to one such approach, Pr (v|w) is defined as a ratio of user sessions in which the keyword v follows keyword w to all user sessions containing keyword w. Pr (v|w) denotes the conditional probability that a keyword v follows keyword w in a user session. The sparseness of the data calls for different techniques that use prior probabilities such as assigning higher importance to keywords from users who belong to the target audience profile and smoothing procedures to refine the above conditional probabilities.

Using these probabilistic modeling techniques, keywords can be predicted that would be most probable given the initial seed set of keywords and similarly, profiles that would be probabilistically closer to the target audience profile. Particularly relevant techniques include graphical models such as, for example, pLSI. For further detail regarding such techniques, reference may be made to *Elements of Statistical Learning Theory: Data Mining, Inference*, and Prediction, T. Hastie, R. Tibshirani, and J. Friedman, Springer Series in Statistics, 2001, and *Probabilistic Latent Semantic Indexing*, T. Hofmann, In Proceedings of the Twenty-Second International ACM-SIGIR Conference on Information Retrieval, 1999, the entire disclosures of both of which are incorporated herein by reference for all purposes.

Data Mining Co-Occurrence Techniques

According to specific embodiments, powerful data mining techniques such as association rules mining (see *Fast Algorithms for Mining Association Rules*, R. Agrawal and R. Srikant, In Proceedings of the 20th International Conference on Very Large Databases, Santiago, Chile, pp. 487-499, 1994, the entire disclosure of which is incorporated herein by reference for all purposes) can be used to effectively mine user data to determine frequent co-occurrences among keywords. These techniques rely on grouping together related items into "itemsets." Itemsets can be defined at different levels of granularity. For example, user session level granularity would consider all keywords occurring within a single user session as an itemset. Similarly, user level granularity would consider all keywords from a single user to be an itemset. User level data could be restricted by considering only keywords in a specific time interval or limited to data from users that belong to a specified user profile. Standard measures such as "support" and "confidence" can be used to control the number and relevance of keywords in the generalized set.

Data Mining Clustering Techniques and Similarity Measures

Some embodiments of the invention employ cluster analysis techniques to effect keyword and target audience profile generalization. Examples of cluster analysis techniques which may be used with such embodiments are described in Survey of *Clustering Data Mining Techniques*, P. Berkhin, Technical Report, Accrue Software, 2002, the entire disclosure of which is incorporated herein by reference for all purposes. Clustering may generally be applied to keywords using one or more of a broad base of information to determine similarity. Examples of information which may be used for this purpose include, but are not limited to, URL overlap in the search results for a pair of keywords, occurrence of two keywords in the same user session, occurrence of two keywords in the search history of the same user, semantic similarity of two keywords (e.g., using WordNet from Princeton University), and syntactic similarity of two keywords via normalization techniques such as stemming.

Given a keyword set W and a user profile U, represent each keyword $w=(\delta_{wu}), u \in U$, where $\delta_{wu}$ is zero if user u has not searched for the keyword w and a measure of frequency of the user u's click behavior for the keyword w otherwise. Notice that this representation is symmetric—in the same way as each keyword is a vector $w=(\delta_{wu})$, $u \in U$, each user can be represented as a vector $u=(\delta_{uw})$, $w \in W$. We refer to this representation as the keyword-by-user representation. Effectively, this representation is a matrix where the rows represent keywords (W) and the columns represent users (U). This representation is also referred to as the bag of words representation in text mining applications.

A variety of similarity measures can be used to cluster the above keywords-by-user matrix and identify sets of keywords that are similar to each other. For example a cosine coefficient can be defined for two keywords w and v as $$sim_{cos}(w, v) = \frac{\sum_u \delta_{wu} \delta_{vu}}{\sqrt{\sum_u \delta_{wu}^2 \sum_u \delta_{vu}^2}}$$

This measure of similarity can be used in conjunction with a threshold to find keywords close to a seed keyword set. For instance, we might use max similarity of a given w to one of keywords in a seed set, average similarity, or any other aggregate similarity measure.

If the rows (w) of the keyword-by-user matrix are normalized such that they sum to one then they can be considered as probability distributions. Two probability distributions can be compared via the Kullback-Leibler (KL) distance.

$$dist_{KL}(w, v) = \sum_u \delta_{wu} \log \frac{\delta_{wu}}{\delta_{vu}}.$$

Several regularizations are available to handle cases where the denominator $\delta_{vu}$ is zero. An example of a suitable regularization is the well-known Good-Turing smoothing described in *The Population Frequencies of Species and the Estimation of Population Parameters*, I. Good, Biometrika, 40, 237-264, the entire disclosure of which is incorporated herein by reference for all purposes. Clustering with respect to KL-distance is called informational clustering. Note that the KL-distance is an asymmetric distance measure. However, it has an outstanding property in that it is symmetrically applicable both to rows and columns. If we merge two rows with the minimum KL-distance it results in a reduction of information contained in the matrix. The same quantity is affected by merging together two columns (e.g., users). Simultaneously clustering rows and columns of the matrix guarantees the optimization of a single objective function—minimization of information loss. This process is called co-clustering which is described in *Information-theoretic co-clustering*, I. Dhillon, S. Mallela, and D. Modha, In Proceedings of the Ninth ACM SIGKDD International Conference on Knowledge Discovery and Data Mining, pp. 89-98, 2003, the entire disclosure of which is incorporated herein by reference for all purposes.

Other generalized expressions such as Bregman divergence may also be used in this context. See *Clustering with Bregman divergences*, A. Banedjee, S. Merugu, I. Dhillon, and J. Ghosh, In Proceedings of the SIAM International Conference on Data Mining, pp. 234-245, 2004, the entire disclosure of which is incorporated herein by reference for all purposes. If we allow only a very small reduction of information the process results in several tight keyword and user clusters. Keywords clustered together with elements of a seed set constitute seed keyword set generalization. Users clustered together with users corresponding to a target audience profile constitute target audience profile generalization. The process is controlled by a single parameter, i.e., relative reduction of mutual information.

Search Based Similarity Measures

According to another set of embodiments, results returned by a search engine in response to user queries are leveraged to compute the similarity of two keywords. Assume for example, that a search engine returns m results for keyword w, n results for keyword v, and k results for a combination of two keywords. Obviously if w and v are identical, then m=n=k. If w and v have nothing common, the number k of web documents containing them both is very small. Therefore, the following similarity measures reflect co-occurrence rate within web content:

$$sim_1(w, v) = \frac{2k}{m+n}, \quad sim_2(w, v) = \frac{2k}{\max\{m, n\}}$$

Again, given the similarity measure, we can generalize a seed keyword set by taking a union of all keywords similar to one of the keywords in a seed set.

In a refinement of such an approach, instead of taking a union of keywords close to one single keyword in a seed set, we can create a query that includes all keywords in a seed set, or we can create several queries each including a subset of a seed set. According to a further refinement, the similarity measures defined would not only consider documents containing both words w and v, but containing them within a window of a fixed length to ensure the nearness of the two keywords.

Text Annotation

The above method only takes into account documents containing the keywords in the set W. Counting search engine results is a simple and a straightforward process. However search engine results also return specified texts or collection of texts in response to user queries. According to a specific implementation, such text documents can be leveraged to determine the similarity between keywords and user profiles. For example, we can take k top search engine results and evaluate the similarity of w and v by comparing the text documents. According to some such embodiments, different similarity metrics from the literature on information retrieval can be used. For example, see *Modern Information Retrieval: A Brief Overview*, Amit Singhal, IEEE Data Eng. Bull. 24(4): 35-43 (2001).

Expansions Based on Lattices

Some of the approaches discussed herein focus generally on at least one of two types of propagations. First, "hierarchical" propagations allow, for example, properties of a session to flow to other sessions by the same user. These propagations often have simple closed-form solutions and may be more efficiently computed. Second, "link-style" propagations allow, for example, properties of a session to flow to other sessions that contain the same words. Iterative formulations of these propagations typically do not have simple closed-form solutions and are often actually computed by iteration.

A specific embodiment of the invention proceeds as follows. First, we explore the idea of hierarchical propagation as far as possible. Then we re-introduce the notion of propagating between words and sessions. Next, we revisit the idea of generalizing from a session to a user and then a profile by moving from hierarchical generalizations to a more general lattice structure (i.e., another form of generalization structure). This approach loses in terms of efficient computation, but gains in terms of expressive power. At this point, we have a clean scheme for expressing a number of possible propagations that may be quadratic in the number of users in a much more efficient representation that captures our domain knowledge in terms of the types of propagations that make sense (i.e., across similar user profiles).

This gives us a rich structure on top of user sessions. We then introduce a similar structure on top of words, which allows us to capture sets of words that are used by multiple advertisers in order to target a particular group of users. A few techniques for creating such a structure on words are suggested below.

Finally, we wrap this together into a structure that allows a single lattice generalizing from a user session (easily pushed down to a single search or navigation event) to the rest of the space using information about user profiles as well as relationships among keywords. Some applications for this structure are suggested below.

Hierarchical Propagation

Consider first a purely hierarchical world allowing generalizations from sessions to users to profiles to profile categories. Let's assume that user information has been placed into a hierarchy using a suitable technique. One such technique is simple leveling, in which a hierarchy on the age variable is appended to each leaf of a hierarchy on the gender variable. Another technique is hierarchical clustering, in which a measure of similarity between different profiles is used to produce a tree of clusters. Another technique is metric approximation, in which a notion of distance between profiles is approximated using a tree. Typically the tree is chosen to minimize some measure of distortion in the original metric. See *Probabilistic Approximations of Metric Spaces and Its Algorithmic Applications*, Yair Bartal, FOCS 1996: 184-193. We may therefore perform highly efficient propagations up and down this tree using rules that are either learned or generated by domain experts. Any real system should make special use of hierarchy whenever possible as the execution could be much faster.

Bipartite Propagations

At this point, we reintroduce the structure described above, i.e., a bipartite graph connecting user sessions to words (recall that a "word" in this context may be a search term which may, in turn, contain several tokens). Properties of the word, including its relevance to a particular campaign, may be propagated to sessions that contain the word. It is even possible that nonlinear propagations may be required. For instance, it may be that a session containing references to three distinct words known to be relevant to a campaign should be treated differently from sessions containing three references to the same word, and it is possible that doubling the number of distinct words may do more than double the relevance of the session. These are straightforward modifications of the equations as given, but with possible impact on the theoretical convergence properties. Nonetheless, linear propagations are a reasonable starting point, as described above.

Beyond Hierarchies: More Complex Generalization Structures

Previously, we made the assumption that profiles could be generalized into a hierarchy. Let us revisit this assumption. A 14-year-old male from Detroit probably shares some properties with 14-year-old females, others with 15-year-old males, and yet others with other individuals from Detroit. Allowing all three (or more) generalizations would clearly yield a more powerful model. In fact, this model is specifically the reason that OLAP cubes are not modeled as trees, despite the great additional algorithmic complexity that results from the more accurate dimensional data model. We instead view a profile as a set of dimensions, each of which allows some form of generalization. For example, age is a numerical dimension which may be generalized to intervals, with interval containment representing increasing generality. Geography is often represented as a hierarchical dimension, with levels for continent, country, state/county, city, and so forth. To generalize these two notions, a dimension may be thought of as an arbitrary order-theoretic lattice. Thus, even though techniques described below employ a join semi-lattice, the more general notion holds for trees and lines, and embodiments employing the more general notion are therefore contemplated.

This approach has the nice property that multiple dimensions may be mechanically combined into a single cross-product lattice representing the entire generalization structure, capturing for example the three types of generalizations of the 14-year-old Detroit male discussed above. Costs are then assigned to each generalization, and rules are provided for how the costs may be combined across dimensions. Many of the approaches combined above, from graph propagation and machine learning, generalize to lattices, and we include such natural generalizations as part of the present invention. Further, embodiments of the invention encompass natural approaches drawn from Bayesian statistics, fuzzy logic, graphical models, or more ad hoc notions of the "appropriate" way to combine such distances.

While many of the techniques above may be generalized to the lattice model, a specific example will now be described for concreteness. Consider a function f on the nodes of the lattice which gives for each node the uniformity of the node—any user/keyword combination within the node is likely to behave similarly. Such a function could be defined, for example, as the standard deviation of the probability that a particular user/keyword would click on a given ad. This quantity could be produced by sampling. This function could now be applied in several ways including, for example, the following. Given an initial lattice node representing the keywords and user profile of interest (e.g., a target audience profile provided by an advertiser), find the set of more general nodes with uniformity above a certain threshold. This represents a natural generalization of both keywords and users. Many other such approaches may be considered, some of which are straightforward generalizations of the techniques given above.

Adding Generalization Structure to Keywords

We have now considered a fairly expressive model for expressing generalization of results from one session to another, guided by "domain knowledge" in the form of the user profile variables that have been determined to group users in useful ways. This may be seen as extending the previous approaches by incorporating domain knowledge about user demographics and psychographics into the propagations. However, we may similarly ask whether such structures exist for the keywords themselves. That is, can we know that certain classes of words are natural generalizations of other words?

Consider a situation in which an advertiser has presented several different sets of terms, each of which is appropriate for one campaign. Assume further that a set of common words appears in each set, representing the general domain of interest of the advertiser, i.e., any user entering such a term may well be relevant for multiple items in the portfolio of the advertiser. To continue along the same lines, assume that multiple advertisers in the same domain have entered sets of bid keywords, each of which represents that advertiser's best guess at a way to encapsulate the appropriate target segment using the language of disjunctions of words (where again, 'words' should be read as phrases). The words selected by two distinct advertisers will normally not be identical, for two reasons. First, each advertiser will have slightly different targeting, and so will attempt to capture a different segment. And second, each advertiser will use a different process to generate the words in the first place, and the outcome will likely have some significant amount of noise, particularly in the area of recall. Discrepancies due to the latter factor are an opportunity to broaden the set of available advertisements and add liquidity to the market. They suggest that some significant processing of the various set of advertiser keywords could reveal structure that will help in generalization.

We now give some examples of approaches for combining words into useful collections, with the understanding that the present invention is not limited to these examples. As mentioned above with reference to clustering techniques, keywords can be grouped together using transformations applied by a stemmer or a thesaurus, or with reference to tools like WordNet or equivalent sources of word relationships. In addition, providers of advertising may possess large amounts of information provided by advertisers about collections of words that cleanly (with high precision but low recall) identify a target segment—words that occur in one cluster may propagate to similar clusters.

According to some embodiments, a consensus clustering algorithm, defined broadly, could be applied to all such word collections to discover particular "atomic" collections of words that represent useful often-targeted segments. The combinatorial problem here is to find a vocabulary of sets which efficiently approximately covers all advertiser word collections. We would hope that the segments defined by this vocabulary would have significant overlap with existing segments (e.g., 14-year-old males), but would differ in two important ways. First, in some cases, the word-based segments would provide a different segmentation, for example, capturing $1^{st}$-person shooter games which are correlated with but not equivalent to any particular demographic profiles. Second, word-based segments offer the hope of finer-grained segments than with standard demographic variables. Such a consensus clustering algorithm could be used to find sets of words that have two properties: (1) they are cohesive with respect to the segments defined by advertisers, and (2) they are cohesive with respect to user sessions, and hence capture both user and advertiser behavior well.

According to some implementations, session-level statistics may be mined to pull together keywords that are often used together using, for example, known techniques for query log analysis based on syntactic rules. However, in such cases we're interested in collections that capture a targetable segment, so application of more aggressive clustering based on session co-occurrence only may be appropriate.

Using such approaches, we may imagine another lattice whose leaves (a leaf is an element whose meet with all other elements is either bottom or itself) are words, and whose other nodes represent collections of words that usefully capture segments of users of interest (e.g., users corresponding to a target audience profile). Such a lattice may be taken to represent a set of medium-grained collections of keywords representing the segments of users who tend to apply those keywords. The lattice allows us to specify that one set of keywords is a generalization of another. This could simply be the lattice of subset inclusions in which meet and join are defined as set intersection and union respectively. Alternatively, this could be a lattice defined more carefully to capture the nature of user segments via the language of keyword unions.

As the techniques above show, such a lattice may be provided analytically, or learned from analysis of user behavior, or both. In any case, if the lattice is present, it provides the opportunity to generalize from one set of keywords to another. Observe that linear propagation may again not be the appropriate technique in this case because membership of a few words in multiple collections may imply that users applying those words belong simultaneously to multiple segments, and may have new properties not well-represented by a linear combination of the properties of the two sets.

Adding Keywords to Models of Traffic Segments

Figure 5:
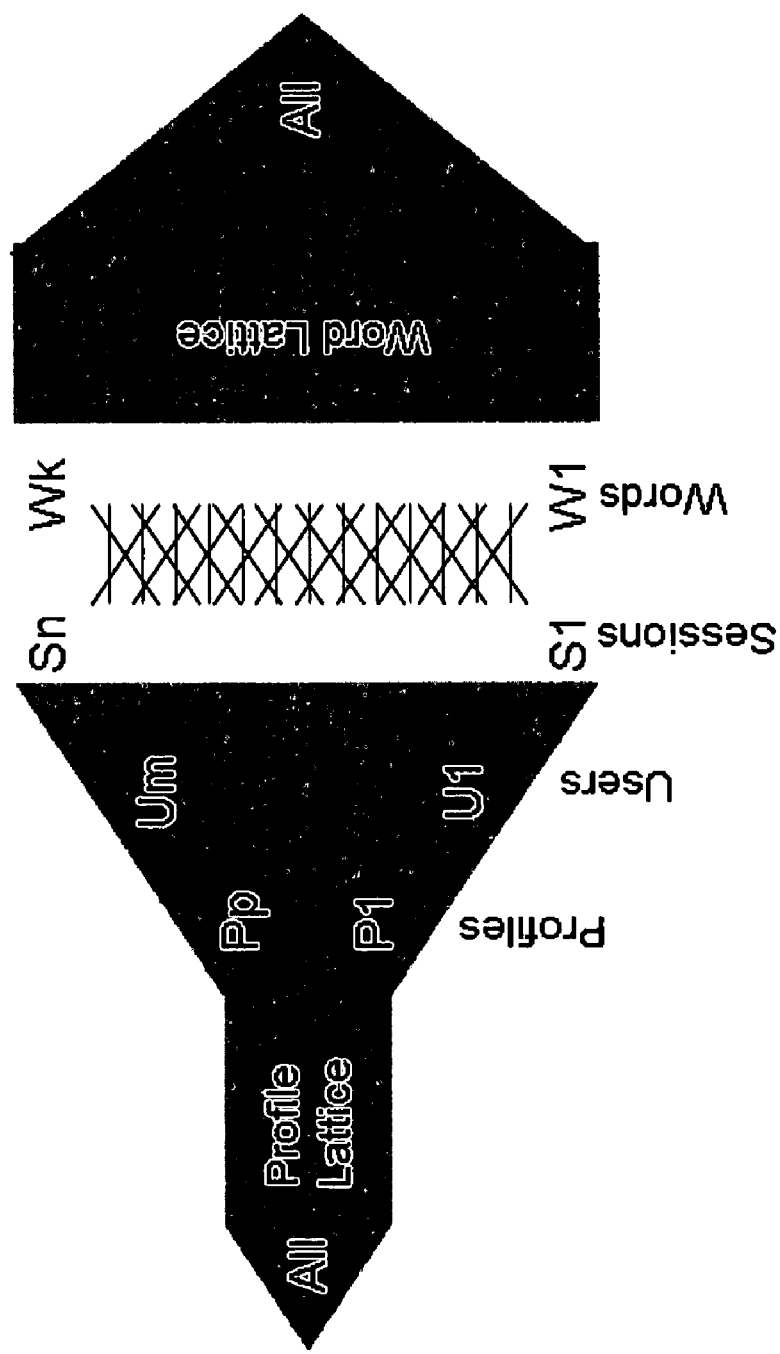
FIG. 5 is a graphical representation of a specific type of generalization structure suitable for use with specific embodiments of the present invention.

We've now talked about a lattice capturing generalizations of user sessions, and another lattice capturing generalizations of words. We've also talked about a bipartite graph connecting these two worlds at their respective leaves. An exemplary representation of such an inclusion structure is shown in FIG. 5. This structure now allows us to characterize segments of customers in terms of two lattices, which may again be combined into a single cross-product lattice. Elements of this combined lattice include 14-year-olds from Kansas (using the profile lattice), and people who use the keywords in set 23 (using the word lattice), and 25-34 year old women from the Midwest who use words from set 11 (using the joint lattice). Once a user has been placed into the lattice at the most specific point possible (based on whatever information is known), and likewise once a campaign has been propagated over the lattice (using any suitable propagation technique), we may determine the relevance of a user to a campaign.

We may also perform additional functions for advertisers. For examples, ads may be pitched more broadly based on generalizations. Keywords may be explicitly suggested to advertisers. Marketers may be provided with an active feedback system trained to home in on better collections of keywords based on iterative user feedback. This operation may be viewed as searching the word generalization lattice for appropriately fine-grained content. Logs may be presented to the user in terms of descriptions of the combined lattice including all the profile and behavioral variables. Such descriptions may be created to convey as rich a sense of the activity as possible within a certain budget. For instance, capturing the users who have clicked using non-overlapping combinations of the profile and behavioral variables.

Generally, the generalization structures of the present invention facilitate the provision of fine-grained segmentations of users in ways that combine behavioral properties (e.g., searches) with other information (e.g., profiles). And embodiments of the invention are not limited to existing topic hierarchies and the like, but may combine such information with, for example, lexical approaches and approaches based on advertisers' domain knowledge.

Combining Results of Different Generalization Methods

As mentioned above and according to various implementations, the various methods referred to and described herein may be used individually to suitably generalize keyword sets and user profiles. In addition, since these methods use different underlying features of keyword and user information, they can be effectively combined to obtain highly relevant generalizations. Notice that each method i described above results in extensions that satisfy the following properties.

$$W_0 \delta W_i^{Method} \epsilon W, U_0 \epsilon U_i^{Method} \epsilon U$$

Simple methods can be used to combine the results obtained from different methods. Assume for example, that we consider three methods A, B, C to generalize a seed keyword set $W_0$. This results in three generalized sets $W_1^{A(a)}$, $W_1^{B(b)}$, $W_1^{C(c)}$, each dependent on the parameters a, b, and c of the respective methods. Consider any suitable measure of distance between two sets of elements d and pick the a so that $$a = \arg\min_a \{ d(W_1^{A(a)}, W_1^{B(b)}) + d(W_1^{A(a)}, W_1^{C(c)}) \}$$

Here b and c are fixed to their initial guess. This means that we try to adjust the parameters a in such a way that the result of A ($W_2^{A(a)}$) would be as close as possible to the generalizations due to B and C. Intuitively, we say that if several methods came up with a new w it means it has higher confidence. Now we can do several iterations alternating adjustments of the parameters a, b, c for the respective methods. This results in more consistent and relevant generalizations.

Campaign Feedback

It should also be noted that the present invention is not limited to "static" methods for generalization of keywords and user profiles in which an initial set of keywords and a user profile is presented, and then based on information available to the system, an generalization is performed. On the contrary, there is another set of techniques encompassed by the scope of the invention which are "dynamic" in that they operate based on a live deployment of an advertising campaign and, through feedback, make use of intermediate campaign results in order to perform generalizations according to the invention. The most effective verification of the quality of generalized keywords and user profiles can only be achieved during such campaign runs. Metrics used in this type of verification can be used as valuable feedback for timely adjustment of the current campaigns or for future campaigns.

According to the present invention, a method of incorporating such campaign feedback is provided. Given importance weights $p^w$, $p^u$ assigned to each keyword in an generalized set and to each user in an generalized user profile, we can update them in real-time iteratively. For example, when a user u clicks on an ad after searching for a keyword (query) w, the importance weights may be updated as follows:

$$p^w \leftarrow p^w + \kappa, \quad p^u \leftarrow p^u \lambda$$

Here, $\kappa$ and $\lambda$ are parameters derived from campaign feedback. Additionally, the initial $W_0$ and $U_0$ may be updated to add to them w and u with highest updated importance weights and then repeat the generalization. This corresponds to restarting the generalization from a union of initial seed set and profile and keywords and users that actually positively responded to a campaign. In essence, this method leverages accumulated campaign statistics to refine the generalizations.

Figure 6:
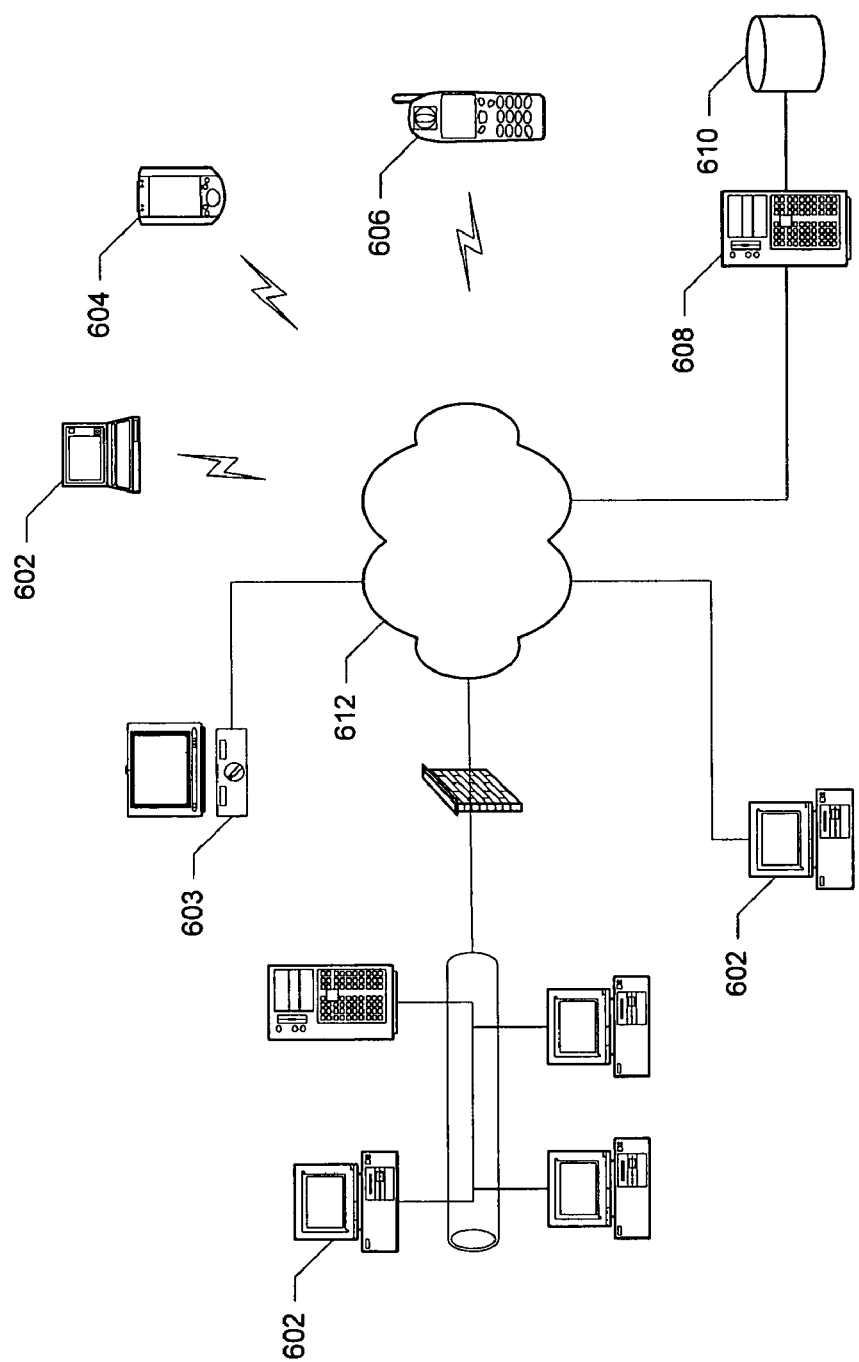
FIG. 6 is a simplified diagram of a network environment in which specific embodiments of the present invention may be implemented.

Embodiments of the present invention may be employed to generalize keyword sets and target audience profiles in any of a wide variety of computing contexts. For example, as illustrated in FIG. 6, implementations are contemplated in which the relevant population of users interact with a diverse network environment via any type of computer (e.g., desktop, laptop, tablet, etc.) 602, media computing platforms 603 (e.g., cable and satellite set top boxes and digital video recorders), handheld computing devices (e.g., PDAs) 604, cell phones 606, or any other type of computing or communication platform.

And according to various embodiments, user data processed in accordance with the invention may be collected using a wide variety of techniques. For example, collection of data representing a user's interaction with a web site or web-based application or service (e.g., the number of page views) may be accomplished using any of a variety of well known mechanisms for recording a user's online behavior. However, it should be understood that such methods of data collection are merely exemplary and that user data may be collected in many other ways. For example, user data may be collected when a user registers with, for example, a particular web site or service.

Once collected, the user data are processed in conjunction with keyword sets and/or target audience profiles to generate the generalized sets and/or profiles according to the invention in some centralized manner. This is represented in FIG. 6 by server 608 and data store 610 which, as will be understood, may correspond to multiple distributed devices and data stores. The invention may also be practiced in a wide variety of network environments (represented by network 612) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by

What is claimed is:

1. A computer-implemented method for generalizing one or more of an initial keyword set or an initial target audience profile for use in an online advertising campaign, comprising:

receiving the initial keyword set and the initial target audience profile as input, the initial keyword set comprising a plurality of initial keywords, the initial target audience profile comprising an initial profile parameter value for each of a plurality of profile parameters;

identifying a first population comprising a plurality of users each corresponding to the initial target audience profile;

retrieving user data representing the first population of users and including both demographic data and online behavioral data for each of the users;

processing the initial keyword set and the initial target audience profile with reference to the user data to determine relationships among the initial keyword set, the initial target audience profile, and the user data, wherein processing the initial keyword set and the initial target audience profile comprises constructing a generalization structure distinct from and representing at least some of the relationships among the initial keyword set, the initial target audience profile, and the user data, the generalization structure comprising a data structure having a plurality of nodes and connections between the nodes, each node representing one or more of the users, the connections between the nodes representing a degree of similarity between connected nodes, the degree of similarity being determined with reference to the demographic data and the online behavioral data associated with the users represented by the connected nodes, selected pairs of connected nodes having manipulable cost values associated therewith representing costs of propagating between the corresponding pairs of connected nodes, and wherein processing the initial keyword set and the initial target audience profile further comprises propagating among the nodes of the generalization structure with reference to the manipulable cost values to identify one or more of (1) additional keywords for inclusion in a generalized keyword set or (2) additional users corresponding to a generalized target audience profile;

generating one or more of the generalized keyword set or the generalized target audience profile with reference to selected ones of the relationships among the initial keyword set, the initial target audience profile, and the user data, wherein the generalized keyword set represents a modification of the initial keyword set including at least some of the plurality of initial keywords and one or more of the additional keywords, and wherein the generalized target audience profile represents a modification of the initial target audience profile representing a second population of users including at least some of the first population of users and one or more of the additional users, the generalized target audience profile comprising modified profile parameter values for selected ones of the plurality of profile parameters.

2. The method of claim 1 wherein generating one or more of the generalized keyword set or the generalized target audience profile comprises generating only one of the generalized keyword set or the generalized target audience profile.

3. The method of claim 1 wherein generating one or more of the generalized keyword set or the generalized target audience profile comprises generating both of the generalized keyword set and the generalized target audience profile.

4. The method of claim 1 wherein processing the initial keyword set and the initial target audience profile with reference to the user data comprises constructing a bipartite graph representing at least some of the relationships among the initial keyword set, the initial target audience profile, and the user data, and identifying additional keywords for inclusion in the generalized keyword set by performing propagations within the bipartite graph.

5. The method of claim 1 wherein processing the initial keyword set and the initial target audience profile with reference to the user data comprises constructing a bipartite graph representing at least some of the relationships among the initial keyword set, the initial target audience profile, and the user data, and identifying additional users by performing propagations within the bipartite graph, selecting at least one additional profile parameter associated with at least some of the additional users for inclusion in the generalized target audience profile.

6. The method of claim 1 wherein processing the initial keyword set and the initial target audience profile with reference to the user data comprises constructing a directed graph representing at least some of the relationships among the initial keyword set, the initial target audience profile, and the user data, each node in the directed graph representing one of the initial keywords and additional keywords derived from the user data, selected nodes in the directed graph being connected by edges which are generated with reference to the user data, and employing a graph subset expansion technique to identify selected ones of the additional keywords for inclusion in the generalized keyword set.

7. The method of claim 6 wherein the graph subset expansion technique comprises a random walk of fixed length over the directed graph.

8. The method of claim 1 wherein processing the initial keyword set and the initial target audience profile with reference to the user data comprises constructing a probabilistic model representing at least some of the relationships among the initial keyword set, the initial target audience profile, and the user data, and identifying one or more of (1) additional keywords for inclusion in the generalized keyword set or (2) additional users corresponding to the generalized target audience profile using the probabilistic model.

9. The method of claim 1 wherein processing the initial keyword set and the initial target audience profile with reference to the user data comprises generating a plurality of itemsets, each itemset grouping the initial keywords and additional keywords derived from the user data according to a corresponding one of a plurality of axes, and identifying selected ones of the additional keywords for inclusion in the generalized keyword set using a data mining co-occurrence technique on the itemsets.

10. The method of claim 9 wherein the plurality of axes comprises dimensions derived from any of sessions, users, time intervals, users corresponding to the initial target audience profile, and users corresponding to the generalized target audience profile.

11. The method of claim 1 wherein processing the initial keyword set and the initial target audience profile with reference to the user data comprises constructing a matrix relating each of the users to selected ones of the initial keywords and additional keywords derived from the user data according to use by each user of the selected keywords, and applying at least one similarity measure to the matrix to identify specific ones of the additional keywords for inclusion in the generalized keyword set.

12. The method of claim 1 wherein processing the initial keyword set and the initial target audience profile with reference to the user data comprises forming keyword clusters and user clusters, each keyword cluster including selected ones of the initial keywords and additional keywords derived from the user data, each user cluster including first users corresponding to the initial target audience profile and second users having corresponding user profiles including at least some of the profile parameters of the initial target audience profile and at least one additional profile parameter not included in the target audience profile.

13. The method of claim 12 wherein processing the initial keyword set and the initial target audience profile with reference to the user data further comprises evaluating the keyword clusters to identify specific ones of the additional keywords for inclusion in the generalized keyword set.

14. The method of claim 13 wherein evaluating the keyword clusters comprises evaluating similarities between the specific ones of the additional keywords and the initial keywords with reference to any of a URL overlap in search results for the specific keywords, co-occurrence of the specific keywords in user sessions, co-occurrence of the specific keywords in search histories of specific users, semantic similarity of the specific keywords, and syntactic similarity of the specific keywords.

15. The method of claim 12 wherein processing the initial keyword set and the initial target audience profile with reference to the user data further comprises evaluating the user clusters to identify specific ones of the second users corresponding to the generalized target audience profile.

16. The method of claim 1 wherein processing the initial keyword set and the initial target audience profile with reference to the user data comprises identifying selected ones of additional keywords derived from the user data which are similar to at least one of the initial keywords using a similarity measure, the similarity measure relating to co-occurrence of the selected additional keywords with the at least one of the initial keywords in search results included in the user data.

17. The method of claim 16 wherein the co-occurrence of the selected additional keywords with the at least one of the initial keywords in the search results comprises co-occurrence within a string associated with the search results.

18. The method of claim 1 wherein processing the initial keyword set and the initial target audience profile with reference to the user data comprises constructing a keyword space with reference to search results corresponding to at least some of the initial keywords, mapping additional keywords derived from the user data to the keyword space, and identifying selected ones of the additional keywords for inclusion in the generalized keyword set with reference to the mapping and a similarity measure relating the selected additional keywords and the at least some of the initial keywords represented in the keyword space.

19. The method of claim 18 wherein the similarity measure comprises a textual similarity measure.

20. The method of claim 1 wherein processing the initial keyword set and the initial target audience profile with reference to the user data comprises in combination two or more of (1) constructing a bipartite graph representing at least some of the relationships and performing propagations within the bipartite graph, (2) constructing a directed graph representing at least some of the relationships and employing a graph subset expansion technique, (3) constructing and using a probabilistic model representing at least some of the relationships, (4) generating a plurality of itemsets, each itemset grouping the initial keywords and additional keywords derived from the user data and using a data mining co-occurrence technique on the itemsets, (5) constructing a matrix relating each of the users to selected ones of the initial keywords and additional keywords derived from the user data and applying at least one similarity measure to the matrix, (6) forming keyword clusters and user clusters, each keyword cluster including selected ones of the initial keywords and additional keywords derived from the user data, each user cluster including first users corresponding to the initial target audience profile and second users having corresponding user profiles including at least some of the profile parameters of the initial target audience profile and at least one additional profile parameter not included in the target audience profile, and evaluating the keyword and user clusters, (7) identifying selected ones of additional keywords derived from the user data which are similar to at least one of the initial keywords using a similarity measure, or (8) constructing a keyword space with reference to search results corresponding to at least some of the initial keywords, mapping additional keywords derived from the user data to the keyword space, and identifying selected ones of the additional keywords for inclusion in the generalized keyword set with reference to the mapping and a similarity measure.

21. The method of claim 1 further comprising performing at least one additional iteration of the processing and generating steps using one or more of the generalized keyword set or the generalized target audience profile as input.

22. The method of claim 21 wherein the at least one additional iteration uses only one of the generalized keyword set or the generalized target audience profile as input.

23. The method of claim 21 wherein the at least one additional iteration uses both of the generalized keyword set and the generalized target audience profile as input.

24. The method of claim 21 further comprising, before performing the at least one additional iteration, employing the one or more of the generalized keyword set or the generalized target audience profile to conduct an advertising campaign, and collecting statistics relating to effectiveness of the advertising campaign, wherein the at least one additional iteration is performed with reference to the statistics.

25. The method of claim 21 further comprising determining whether to perform the at least one additional iteration with reference to at least one constraint.

26. The method of claim 25 wherein the at least one constraint comprises one or more of a budget, a predefined number of iterations, effectiveness of an advertising campaign using the one or more of the generalized keyword set or the generalized target audience profile, relevance of the one or more of the generalized keyword set or the generalized target audience profile to a market, a difference between one or more of the initial keyword set or the initial target audience profile and the corresponding one of the generalized keyword set or the generalized target audience profile.

27. The method of claim 1 further comprising employing the one or more of the generalized keyword set or the generalized target audience profile to conduct an advertising campaign.

28. The method of claim 1 wherein processing the initial keyword set and the initial target audience profile with reference to the user data comprises constructing a generalization lattice using the initial keyword set, the initial target audience profile, and the user data, a first node in the generalization lattice representing the initial keyword set and the initial target audience profile, defining a uniformity function which defines for each node in the lattice a uniformity value of the corresponding node which represents a likelihood that the corresponding node will behave similarly to the first node, and identifying all nodes in the lattice having a uniformity value above a threshold.

29. A computer-implemented method for generalizing an initial keyword set for use in an online advertising campaign, comprising:
receiving the initial keyword set as input, the initial keyword set comprising a plurality of initial keywords;
retrieving user data representing a population of users and including both demographic data and online behavioral data for each of the users;
processing the initial keyword set with reference to the user data to determine relationships among the initial keyword set and the user data, wherein processing the initial keyword set with reference to the user data comprises constructing a generalization structure distinct from and representing at least some of the relationships among the initial keyword set and the user data, the generalization structure comprising a data structure having a plurality of nodes and connections between the nodes, each node representing one or more of the users, the connections between the nodes representing a degree of similarity between connected nodes, the degree of similarity being determined with reference to the demographic data and the online behavioral data associated with the users represented by the connected nodes, selected pairs of connected nodes having manipulable cost values associated therewith representing costs of propagating between the corresponding pairs of connected nodes, and wherein processing the initial keyword set further comprises propagating among the nodes of the generalization structure with reference to the manipulable cost values to identify additional keywords for inclusion in a generalized keyword set; and
generating the generalized keyword set with reference to selected ones of the relationships among the initial keyword set and the user data, wherein the generalized keyword set represents a modification of the initial keyword set including at least some of the plurality of initial keywords and one or more of the additional keywords.

30. The method of claim 29 wherein processing the initial keyword set with reference to the user data comprises constructing a bipartite graph representing at least some of the relationships among the initial keyword set and the user data, and identifying additional keywords for inclusion in the generalized keyword set by performing propagations within the bipartite graph.

31. The method of claim 29 wherein processing the initial keyword set with reference to the user data comprises constructing a directed graph representing at least some of the relationships among the initial keyword set and the user data, each node in the directed graph representing one of the initial keywords and additional keywords derived from the user data, selected nodes in the directed graph being connected by edges which are generated with reference to the user data, and employing a graph subset expansion technique to identify selected ones of the additional keywords for inclusion in the generalized keyword set.

32. The method of claim 31 wherein the graph subset expansion technique comprises a random walk of fixed length over the directed graph.

33. The method of claim 29 wherein processing the initial keyword set with reference to the user data comprises constructing a probabilistic model representing at least some of the relationships among the initial keyword set and the user data, and identifying additional keywords for inclusion in the generalized keyword set using the probabilistic model.

34. The method of claim 29 wherein processing the initial keyword set with reference to the user data comprises generating a plurality of itemsets, each itemset grouping the initial keywords and additional keywords derived from the user data according to a corresponding one of a plurality of axes, and identifying selected ones of the additional keywords for inclusion in the generalized keyword set using a data mining co-occurrence technique on the itemsets.

35. The method of claim 34 wherein the plurality of axes comprises dimensions derived from any of sessions, users, time intervals, users corresponding to an initial target audience profile, and users corresponding to a generalized target audience profile.

36. The method of claim 29 wherein processing the initial keyword set with reference to the user data comprises constructing a matrix relating selected ones of the users to selected ones of the initial keywords and additional keywords derived from the user data according to use by each user of the selected keywords, and applying at least one similarity measure to the matrix to identify specific ones of the additional keywords for inclusion in the generalized keyword set.

37. The method of claim 29 wherein processing the initial keyword set with reference to the user data comprises forming keyword clusters, each keyword cluster including selected ones of the initial keywords and additional keywords derived from the user data, and evaluating the keyword clusters to identify specific ones of the additional keywords for inclusion in the generalized keyword set.

38. The method of claim 37 wherein evaluating the keyword clusters comprises evaluating similarities between the specific ones of the additional keywords and the initial keywords with reference to any of a URL overlap in search results for the specific keywords, co-occurrence of the specific keywords in user sessions, co-occurrence of the specific keywords in search histories of specific users, semantic similarity of the specific keywords, and syntactic similarity of the specific keywords.

39. The method of claim 29 wherein processing the initial keyword set with reference to the user data comprises identifying selected ones of additional keywords derived from the user data which are similar to at least one of the initial keywords using a similarity measure, the similarity measure relating to co-occurrence of the selected additional keywords with the at least one of the initial keywords in search results included in the user data.

40. The method of claim 39 wherein the co-occurrence of the selected additional keywords with the at least one of the initial keywords in the search results comprises co-occurrence within a string associated with the search results.

41. The method of claim 29 wherein processing the initial keyword set with reference to the user data comprises constructing a keyword space with reference to search results corresponding to at least some of the initial keywords, mapping additional keywords derived from the user data to the keyword space, and identifying selected ones of the additional keywords for inclusion in the generalized keyword set with reference to the mapping and a similarity measure relating the selected additional keywords and the at least some of the initial keywords represented in the keyword space.

42. The method of claim 41 wherein the similarity measure comprises a textual similarity measure.

43. The method of claim 29 wherein processing the initial keyword set with reference to the user data comprises in combination two or more of (1) constructing a bipartite graph representing at least some of the relationships and performing propagations within the bipartite graph, (2) constructing a directed graph representing at least some of the relationships and employing a graph subset expansion technique, (3) constructing and using a probabilistic model representing at least some of the relationships, (4) generating a plurality of itemsets, each itemset grouping the initial keywords and additional keywords derived from the user data and using a data mining co-occurrence technique on the itemsets, (5) constructing a matrix relating each of the users to selected ones of the initial keywords and additional keywords derived from the user data and applying at least one similarity measure to the matrix, (6) forming keyword clusters, each keyword cluster including selected ones of the initial keywords and additional keywords derived from the user data, and evaluating the keyword clusters, (7) identifying selected ones of additional keywords derived from the user data which are similar to at least one of the initial keywords using a similarity measure, or (8) constructing a keyword space with reference to search results corresponding to at least some of the initial keywords, mapping additional keywords derived from the user data to the keyword space, and identifying selected ones of the additional keywords for inclusion in the generalized keyword set with reference to the mapping and a similarity measure.

44. The method of claim 29 further comprising performing at least one additional iteration of the processing and generating steps using the generalized keyword set as input.

45. The method of claim 44 further comprising, before performing the at least one additional iteration, employing the generalized keyword to conduct an advertising campaign, and collecting statistics relating to effectiveness of the advertising campaign, wherein the at least one additional iteration is performed with reference to the statistics.

46. The method of claim 44 further comprising determining whether to perform the at least one additional iteration with reference to at least one constraint.

47. The method of claim 46 wherein the at least one constraint comprises one or more of a budget, a predefined number of iterations, effectiveness of an advertising campaign using the generalized keyword set, relevance of the generalized keyword set to a market, or a difference between the initial keyword set and the generalized keyword set.

48. The method of claim 29 further comprising employing the generalized keyword set to conduct an advertising campaign.

49. The method of claim 29 wherein processing the initial keyword set with reference to the user data comprises constructing a generalization lattice using the initial keyword set and the user data, a first node in the generalization lattice representing the initial keyword set, defining a uniformity function which defines for each node in the lattice a uniformity value of the corresponding node which represents a likelihood that the corresponding node will behave similarly to the first node, and identifying all nodes in the lattice having a uniformity value above a threshold.

50. A computer-implemented method for generalizing an initial target audience profile for use in an online advertising campaign, comprising:
receiving the initial target audience profile as input, the initial target audience profile comprising an initial profile parameter value for each of a plurality of profile parameters;
identifying a first population comprising a plurality of users each corresponding to the initial target audience profile;

retrieving user data representing the first population of users and including both demographic data and online behavioral data for each of the users;

processing the initial target audience profile with reference to the user data to determine relationships among the initial target audience profile and the user data, wherein processing the initial target audience profile comprises constructing a generalization structure distinct from and representing at least some of the relationships among the initial target audience profile and the user data, the generalization structure comprising a data structure having a plurality of nodes and connections between the nodes, each node representing one or more of the users, the connections between the nodes representing a degree of similarity between connected nodes, the degree of similarity being determined with reference to the demographic data and the online behavioral data associated with the users represented by the connected nodes, selected pairs of connected nodes having manipulable cost values associated therewith representing costs of propagating between the corresponding pairs of connected nodes, and wherein processing the initial target audience profile further comprises propagating among the nodes of the generalization structure with reference to the manipulable cost values to identify additional users corresponding to a generalized target audience profile; and generating the generalized target audience profile with reference to selected ones of the relationships among the initial target audience profile and the user data, wherein the generalized target audience profile represents a modification of the initial target audience profile representing a second population of users including at least some of the first population of users and one or more of the additional users, the generalized target audience profile comprising modified profile parameter values for selected ones of the plurality of profile parameters.

51. The method of claim 50 wherein processing the initial target audience profile with reference to the user data comprises constructing a bipartite graph representing at least some of the relationships among the initial target audience profile and the user data, and identifying additional users by performing propagations within the bipartite graph, selecting at least one additional profile parameter associated with at least some of the additional users for inclusion in the generalized target audience profile.

52. The method of claim 50 wherein processing the initial target audience profile with reference to the user data comprises constructing a directed graph representing at least some of the relationships among the initial target audience profile and the user data, each node in the directed graph representing one of a user corresponding to the initial target audience profile and an additional user derived from the user data and having a corresponding user profile including at least some of the profile parameters of the initial target audience profile and at least one additional profile parameter not included in the target audience profile, selected nodes in the directed graph being connected by edges which are generated with reference to the user data, and employing a graph subset expansion technique to identify selected ones of the additional users corresponding to the generalized target audience profile.

53. The method of claim 50 wherein processing the initial target audience profile with reference to the user data comprises constructing a probabilistic model representing at least some of the relationships among the initial target audience profile and the user data, and identifying additional users corresponding to the generalized target audience profile using the probabilistic model.

54. The method of claim 50 wherein processing the initial target audience profile with reference to the user data comprises generating a plurality of itemsets, each itemset grouping users corresponding to the initial target audience profile and additional users derived from the user data and having corresponding user profiles including at least some of the profile parameters of the initial target audience profile and at least one additional profile parameter not included in the target audience profile according to a corresponding one of a plurality of axes, and identifying selected ones of the additional users corresponding to the generalized target audience profile using a data mining co-occurrence technique on the itemsets.

55. The method of claim 50 wherein processing the initial target audience profile with reference to the user data comprises constructing a matrix relating each of the users corresponding to the initial target audience profile to at least one additional user having a corresponding user profile including at least some of the profile parameters of the initial target audience profile and at least one additional profile parameter not included in the target audience profile, and applying at least one similarity measure to the matrix to identify specific ones of the additional users corresponding to the generalized target audience profile.

56. The method of claim 50 wherein processing the initial target audience profile with reference to the user data comprises forming user clusters, each user cluster including first users corresponding to the initial target audience profile and second users having corresponding user profiles including at least some of the profile parameters of the initial target audience profile and at least one additional profile parameter not included in the target audience profile, and evaluating the user clusters to identify specific ones of the second users corresponding to the generalized target audience profile.

* * * * *